(12) United States Patent
Ueda et al.

(10) Patent No.: US 9,606,569 B2
(45) Date of Patent: Mar. 28, 2017

(54) OPERATION MECHANISM CONFIGURED TO SET DIFFERENT OPERATION FEELINGS AND IMAGING APPARATUS

(71) Applicant: SONY CORPORATION, Tokyo (JP)

(72) Inventors: Zentaro Ueda, Tokyo (JP); Takuma Araki, Tokyo (JP); Ayumi Matsusako, Tokyo (JP)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 14/496,267

(22) Filed: Sep. 25, 2014

(65) Prior Publication Data

US 2015/0098004 A1    Apr. 9, 2015

(30) Foreign Application Priority Data

Oct. 9, 2013    (JP) .................................. 2013-211566

(51) Int. Cl.
*H04N 5/225* (2006.01)
*G03B 17/02* (2006.01)
*G05G 5/03* (2008.04)
*G05G 1/10* (2006.01)
*G05G 1/08* (2006.01)

(52) U.S. Cl.
CPC ............... *G05G 5/03* (2013.01); *G03B 17/02* (2013.01); *G05G 1/10* (2013.01); *G05G 1/08* (2013.01); *Y10T 74/20474* (2015.01)

(58) Field of Classification Search
CPC ... G05G 1/08; G05G 1/10; G05G 5/03; G06F 3/03543; G06F 3/03362; G06F 3/0312; G06F 3/0362; G06F 3/016; H01H 19/11; H01H 19/20; H01H 19/62; H01H 19/63; H01H 2003/008; H01H 19/001; G03B 9/02; G06N 5/04; H04N 5/2251
USPC .......................... 348/373–376; 396/535, 540
See application file for complete search history.

(56) References Cited

U.S. PATENT DOCUMENTS

| | | | | |
|---|---|---|---|---|
| 3,871,012 A * | 3/1975 | Haraguchi | ............... | G03B 9/18 396/454 |
| 5,914,705 A * | 6/1999 | Johnson | ................... | G06F 3/016 345/163 |
| 6,459,421 B1 * | 10/2002 | Cho | ....................... | G06F 1/1616 345/163 |
| 6,809,727 B2 * | 10/2004 | Piot | ..................... | G06F 3/03543 345/156 |
| 7,443,382 B2 * | 10/2008 | Koo | ....................... | G06F 3/0362 345/163 |
| 7,567,283 B2 * | 7/2009 | Lee | ......................... | H04N 7/142 348/335 |
| 8,446,366 B2 * | 5/2013 | Blandin | .............. | G06F 3/03543 345/156 |

(Continued)

FOREIGN PATENT DOCUMENTS

JP    2013-101306 A    5/2013

*Primary Examiner* — Chia-Wei A Chen
(74) *Attorney, Agent, or Firm* — Chip Law Group

(57) ABSTRACT

There is provided an operation mechanism including an operation part that is slidable with respect to a fixed part, a plurality of operation-feeling generating members configured to generate different operation feelings on the operation part, and a switching part configured to switch the plurality of operation-feeling generating members independently from each other to switch to one of the operation-feeling generating members that is to act on the operation part.

13 Claims, 9 Drawing Sheets

(56) References Cited

U.S. PATENT DOCUMENTS

| | | | |
|---|---|---|---|
| 2004/0207214 A1* | 10/2004 | Lin | E05B 47/0012 292/336.3 |
| 2005/0078209 A1* | 4/2005 | Morinaga | H04N 5/2251 348/375 |
| 2006/0138873 A1* | 6/2006 | Yasuda | G02B 7/102 310/12.24 |
| 2007/0137089 A1* | 6/2007 | William, III | F41G 1/38 42/122 |
| 2007/0146324 A1* | 6/2007 | Blandin | G06F 3/03543 345/163 |
| 2007/0188453 A1* | 8/2007 | O'Sullivan | G06F 3/0312 345/163 |
| 2007/0188454 A1* | 8/2007 | O'Sullivan | G06F 3/03543 345/163 |
| 2007/0229456 A1* | 10/2007 | Pihlaja | G06F 3/0362 345/157 |
| 2008/0117723 A1* | 5/2008 | Hiranuma | G04B 19/283 368/294 |
| 2008/0165128 A1* | 7/2008 | Cheng | G06F 3/03543 345/163 |
| 2009/0026051 A1* | 1/2009 | Chou | H01H 19/11 200/11 R |
| 2009/0096747 A1* | 4/2009 | Chou | G06F 3/038 345/156 |
| 2010/0070242 A1* | 3/2010 | Renault | G06F 17/50 703/1 |
| 2010/0164908 A1* | 7/2010 | Hill | G06F 3/0362 345/184 |
| 2012/0279841 A1* | 11/2012 | Nakajima | H01H 19/63 200/564 |
| 2013/0027308 A1* | 1/2013 | Peng | G06F 3/03543 345/163 |
| 2013/0163979 A1* | 6/2013 | Kuroiwa | G02B 5/005 396/505 |
| 2014/0266669 A1* | 9/2014 | Fadell | G05B 19/042 340/501 |

* cited by examiner

OPERATION MECHANISM CONFIGURED TO SET DIFFERENT OPERATION FEELINGS AND IMAGING APPARATUS

CROSS REFERENCE TO RELATED APPLICATIONS

This application claims the benefit of Japanese Priority Patent Application JP 2013-211566 filed Oct. 9, 2013, the entire contents of which are incorporated herein by reference.

BACKGROUND

The present disclosure relates to an operation mechanism that can switch operation feelings on an operation part and an imaging apparatus including the operation mechanism.

Imaging apparatuses such as digital cameras and camcorders are subjected to various adjustments such as camera setting including focus adjustment, f-number or zooming setting, shooting mode selection, and the like. For example, the focus, the f number, or zooming can be adjusted by rotating a lens ring of a lens part attached to a main body part of the imaging apparatus. The shooting mode can be selected by rotating a mode dial provided on the main body part.

Operation parts such as the focus ring and the mode dial are set to provide operation feelings for easy user operation. In addition, there has been proposed changing an operation feeling on an operation part in accordance with the purpose for easy and appropriate user setting. For example, JP 2013-101306A discloses an operation apparatus that controls an amount of a load force during rotation of the operation part and that can provide the user with a click feeling in accordance with the mode that has been set.

SUMMARY

However, according to JP 2013-101306A described above, when the click feeling is added to the operation feeling on the operation part, a force including a clicking force added to an operation force in a continuous mode for continuous operation without the click feeling is necessary as an operation force to be applied to the operation part in a click mode. For this reason, putting priority on the click-mode operation force in setting leads to setting a small continuous-mode operation force, while putting priority on the continuous-mode operation force leads to setting a large click-mode operation force. As described above, it is not possible to independently set different operation feelings and the respective operation forces, the different operation feelings being the continuous operation feeling and the click feeling. In light of the foregoing, it is desirable to provide an operation mechanism and the imaging apparatus including the operation mechanism which are novel and improved, and which can independently set different operation feelings and respective operation forces.

According to an embodiment of the present disclosure, there is provided an operation mechanism including an operation part that is slidable with respect to a fixed part, a plurality of operation-feeling generating members configured to generate different operation feelings on the operation part, and a switching part configured to switch the plurality of operation-feeling generating members independently from each other to switch to one of the operation-feeling generating members that is to act on the operation part.

According to another embodiment of the present disclosure, there is provided an imaging apparatus including an imaging part, one or a plurality of operation parts, and a controller part configured to control the imaging part based on information of the one or the plurality of operation parts. The at least one operation part is slidable with respect to a fixed part and includes a plurality of operation-feeling generating members that generate different operation feelings on the operation part, and a switching part that switches the plurality of operation-feeling generating members independently from each other to switch to one of the operation-feeling generating members that is to act on the operation part.

According to the embodiment of the present disclosure, the mechanism that switches the operation feelings on the operation part is configured as follows. The plurality of the operation-feeling generating members generating the operation feelings on the operation part can be switched independently from each other by using the switching part so that the operation feelings can be obtained with appropriate operation forces.

According to the embodiments of the present disclosure described above, it is possible to independently set different operation feelings and respective operation forces. Note that the aforementioned advantageous effects are not necessarily limited, and any of advantageous effects described in the specification or other advantageous effects known from the specification may be exerted in addition to or instead of the advantageous effects described above.

DETAILED DESCRIPTION OF THE EMBODIMENT

Figure 1:
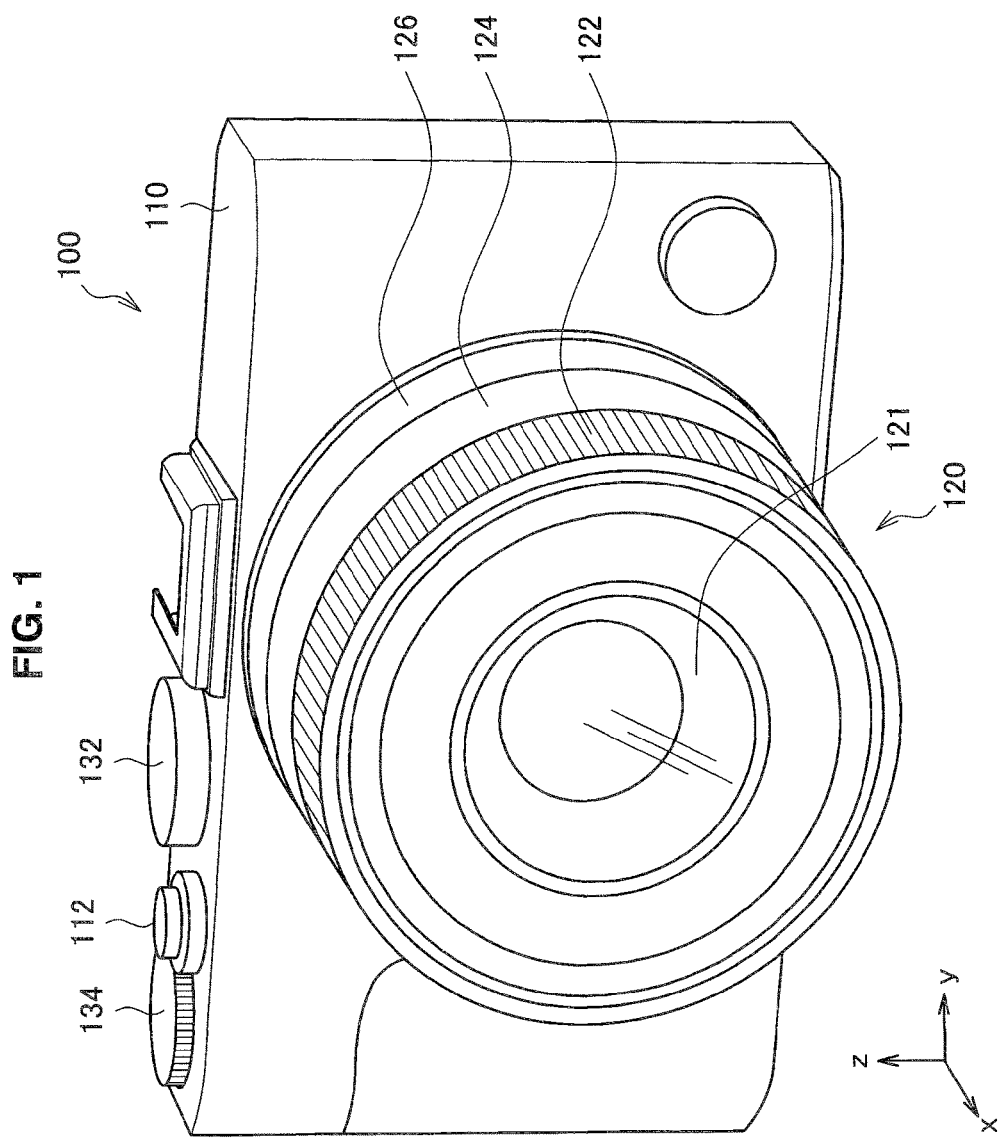
FIG. 1 is a schematic perspective view illustrating the external appearance of the front side of an imaging apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

Figure 2:
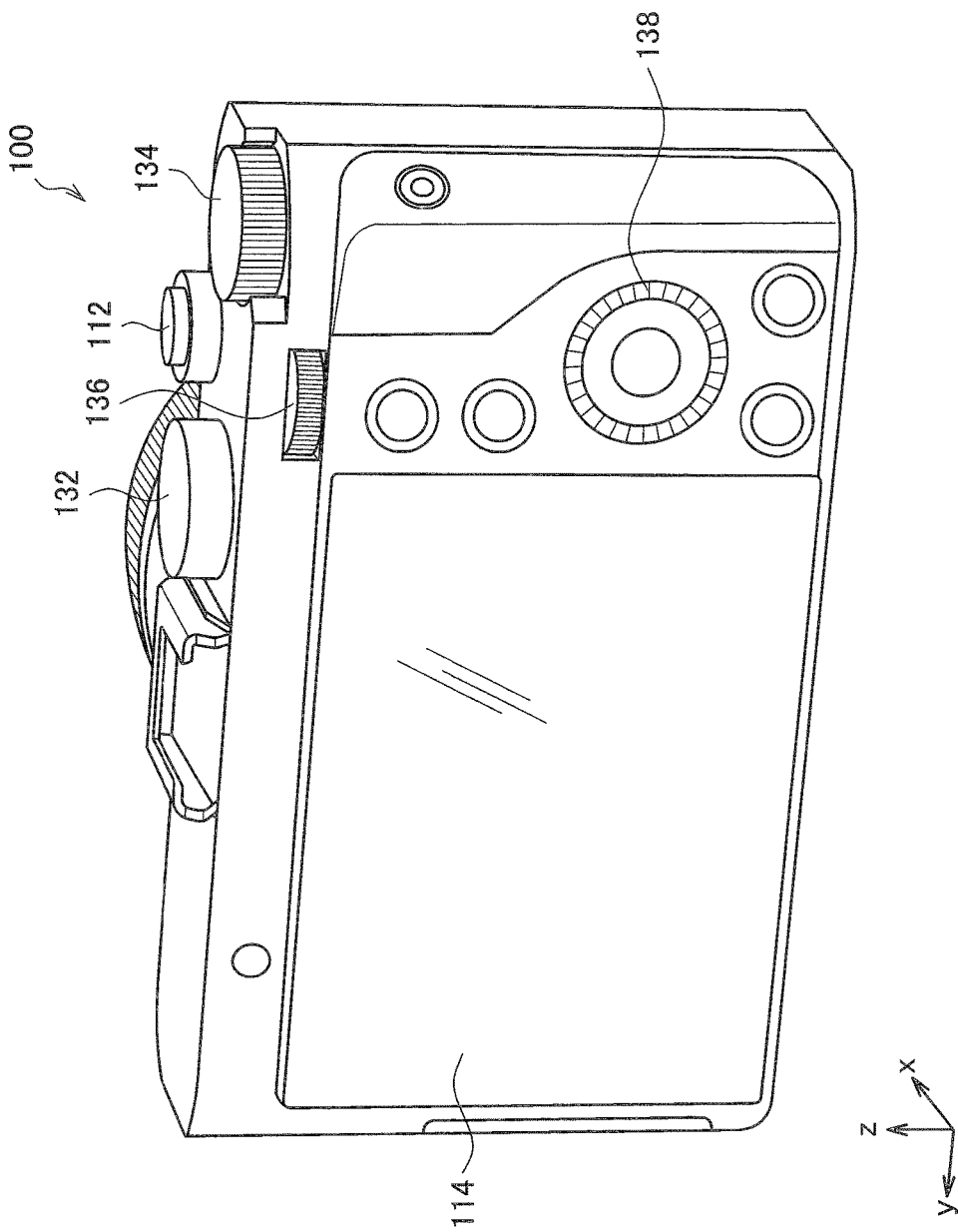
FIG. 2 is a schematic perspective view illustrating the external appearance of the back side of the imaging apparatus according to the embodiment of the present disclosure.

1. Schematic Configuration of Imaging Apparatus
2. Operation Mechanism Configuration
2.1. Operation Mechanism Overview
2.2. Operation Mechanism Configuration Example
(1) Configuration
(2) State in Click Mode
(3) State in Continuous Mode
3. Modifications
3.1. Directions of Acting on Operation Part by Operation-feeling Generating Member
3.2. Changing Degree of Operation Feeling
(1) Changing Load for Operation Feeling
(2) Changing Number of Clicks
3.3. Switching Operation Feelings and Functions
4. Operating Operation-feeling Switching Mechanism 1. Schematic Configuration of Imaging Apparatus Firstly, a schematic configuration of an imaging apparatus 100 according to an embodiment of the present disclosure will be described with reference to FIGS. 1 and 2. FIG. 1 is a schematic perspective view illustrating the external appearance of the front side of the imaging apparatus 100 according to the embodiment of the present disclosure. FIG. 2 is a schematic perspective view illustrating the external appearance of the back side of the imaging apparatus 100 according to the embodiment of the present disclosure.

The present disclosure describes a digital still camera as an example of the imaging apparatus 100 including an operation mechanism that can switch operation feelings on an operation part. The imaging apparatus 100 includes a main body part 110 and a lens part 120 as illustrated in FIGS. 1 and 2.

The main body part 110 includes a controller part that performs overall control on the imaging apparatus, an imaging device, a signal processor part, and the like, the signal processor part processing image signals that are electrical signals corresponding to image data acquired by the imaging device. The imaging device may use an imaging device such as a charge coupled device (CCD) image sensor or a complementary metal oxide semiconductor (CMOS) image sensor. When using the CMOS image sensor, the imaging device converts an optical image formed on an imaging surface into electrical signals.

Each electrical signal that is an image signal is subjected to noise removing processing and gain control processing that leads to a desirable signal level of an imaging signal, thereafter subjected to analog-to-digital signal conversion, and outputted to the signal processor part. The signal processor part performs processing on the received electrical signal, such as defect correction processing of correcting signals of defective pixels in the imaging device, shading correction processing of correcting a decrease of amount of light around the lens, white balance adjustment, and luminance correction. The electrical signal processed by the signal processor part is outputted as the image data to an output part such as a display 114.

The lens part 120 includes: a zoom lens for variable power; a focus lens for focusing; a correction lens part for moving the position of an optical image to be formed on an imaging surface of the imaging device to another position on the imaging surface; and the like. The zoom lens, the focus lens, and the correction lens part may be driven based on lens control signals from the controller part, but may be driven by user operation. The lens part 120 also includes: a mechanical shutter that mechanically adjusts an amount of exposure on the imaging surface of the imaging device; and an iris mechanism that adjusts a light amount for the optical image to be formed on the imaging surface of the imaging device.

Lens positions of the zoom lens and the focus lens, the displacement state of the correction lens part, the set position of the iris mechanism, and the like are detected by an optical system sensor and outputted as positional signals to the controller part. The lens part is also provided with drivers for driving the zoom lens, the focus lens, the correction lens part, the iris mechanism, and the like based on the control signals from the controller part.

As illustrated in FIGS. 1 and 2, the imaging apparatus 100 is provided with operation parts for operating the imaging apparatus 100. For example, the main body part 110 is provided with operation parts such as a shutter button 112, a mode dial 132, an exposure adjustment dial 134, a control dial 136, and a control wheel 138. The lens part 120 is provided with operation parts such as a focus ring 122, a macro switching ring 124, and an iris ring 126.

As described above, the imaging apparatus 100 is provided with the operation parts of various operation styles including: button operation parts operated by being pressed, such as the shutter button 112; and dial (wheel) operation parts operated by being rotated, such as the mode dial 132. In the imaging apparatus 100 according to the present embodiment, each operation part that slides for rotary or linear movement includes an operation-feeling switching mechanism that switches operation feelings on the operation part. This enables selection of an operation feeling on the operation part in accordance with the taste of the user or the function of the operation part. Hereinafter, a configuration and actions of the operation mechanism including the operation-feeling switching mechanism will be described in detail.

2. Operation Mechanism Configuration 2.1. Operation Mechanism Overview

Firstly, an overview of the operation mechanism according to the present embodiment will be described based on FIG. 3, the operation mechanism being able to switch the operation feelings on the sliding operation part.

Figure 3:
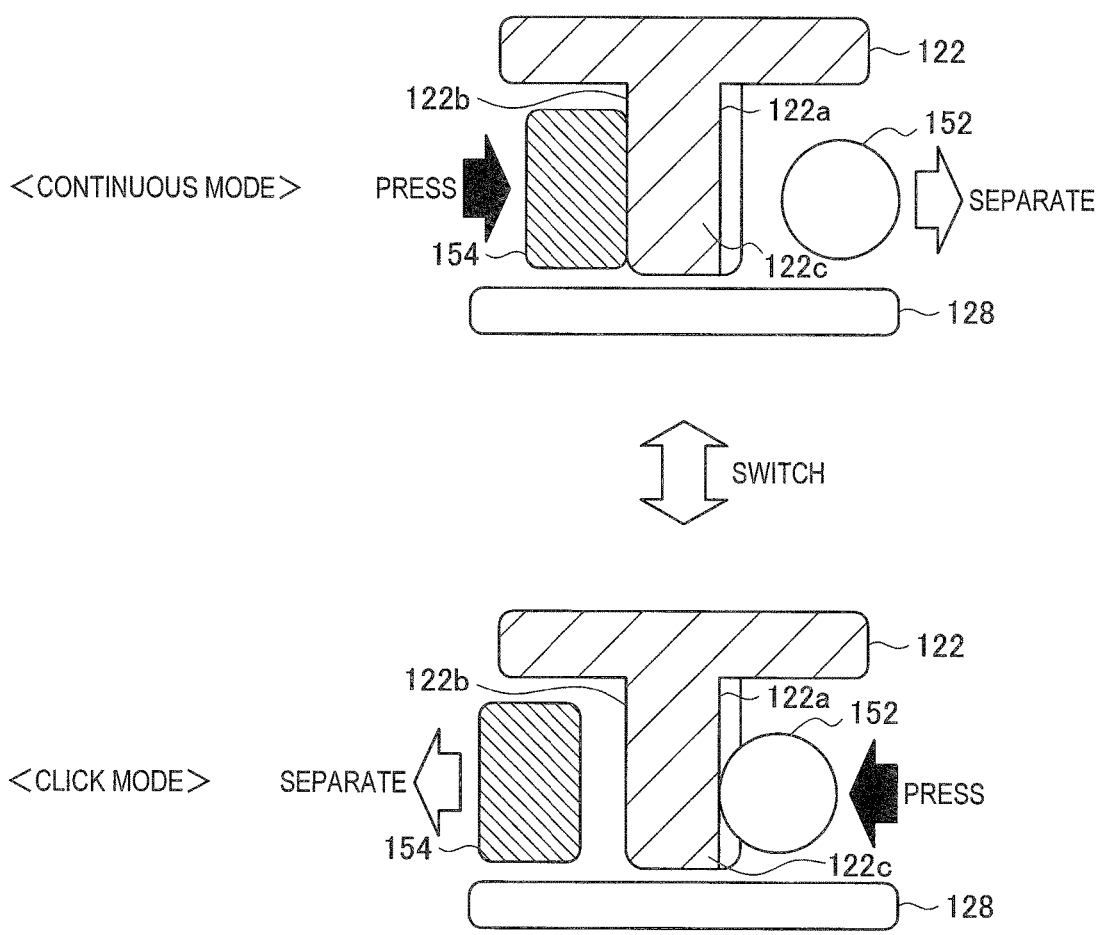
FIG. 3 is an explanatory view illustrating an overview of a focus ring including an operation-feeling switching mechanism according to the embodiment.

FIG. 3 is an explanatory view illustrating an overview of the focus ring 122 including the operation-feeling switching mechanism according to the embodiment. Description is given below of a case where the operation-feeling switching mechanism is applied to the focus ring 122 that is an annular operation part. The focus ring 122 is the annular operation part provided to the lens part 120. By rotating the focus ring 122 around the rotation axis, a focus value can be adjusted. The annular operation part includes the macro switching ring 124, the iris ring 126, and the like, in addition to the focus ring 122. These may also be provided with respective operation-feeling switching mechanisms.

By using the operation-feeling switching mechanism, the focus ring 122 according to the present embodiment can switch two operation-feeling modes of a continuous mode and a click mode to thus change an operation feeling on the focus ring 122, the continuous mode exhibiting continuous sliding without a click feeling, the click mode exhibiting the click feeling. FIG. 3 is an end view schematically illustrating part of the annular portion of the focus ring 122 cut along the diameter passing through the center of rotation. The focus ring 122 is rotatable toward the front or rear side of the drawing plane of FIG. 3. A cylindrical fixed frame 128 supporting the lens 121 and the like of the lens part 120 is inserted in a hollow portion of the focus ring 122. The focus ring 122 has, on its inner peripheral surface, an annular flange part 122c protruding toward an outer peripheral surface of the fixed frame 128.

The flange part 122c, around the rotation axis, of the focus ring 122 has a first surface 122a having repeatedly formed protrusions and recesses. A ball 152 that is an operation-feeling generating member for generating a click feeling is provided on the first surface 122a side, facing the first surface 122a. In contrast, the flange part 122c of the focus ring 122 has a flat second surface 122b on the opposite side from the first surface 122a. A resistive member 154 that is an operation-feeling generating member for generating sliding resistance is provided, facing the second surface 122b. The resistive member 154 comes in contact with the second surface 122b of the flange part 122c of the focus ring 122 to provide an operation load, generating sliding resistance.

As illustrated in the upper part of FIG. 3, when the continuous mode is selected by using a switching part (reference numeral 156 in FIG. 4), the ball 152 is separated from the first surface 122a of the focus ring 122. At the same time, the resistive member 154 is brought into contact with and pressed against the second surface 122b. In the continuous mode, only the resistive member 154 is in contact with and pressed against the focus ring 122, while the ball 152 is not in contact with the focus ring 122. Upon rotation of the focus ring 122 in this state, the focus ring 122 smoothly moves while receiving resistance from the resistive member 154.

In contrast, when the click mode is selected by using the switching part, the ball 152 is brought into contact with and pressed against the first surface 122a of the focus ring 122, as illustrated in the lower part of FIG. 3. At the same time, the resistive member 154 is separated from the second surface 122b. In the click mode, only the ball 152 is in contact with and pressed against the focus ring 122, while the resistive member 154 is not in contact with the focus ring 122. Upon rotation of the focus ring 122 in this state, the ball 152 moves along the protrusions and recesses of the first surface 122a. At this time, it is necessary for the ball 152 to use a larger force in climbing over each protrusion than in moving along each recess. This can generate a click feeling in rotating the focus ring 122.

The operation-feeling generating members in contact with and acting on the focus ring 122 are switched by using the switching part in this way, and thereby an operation feeling on the focus ring 122 can be selected from the continuous and the click modes. In addition, in the operation mechanism including the operation-feeling switching mechanism according to the present embodiment, only the operation-feeling generating member generating an operation feeling corresponding to the selected operation-feeling mode is brought into contact with the focus ring 122 and acts on the focus ring 122, and any other operation-feeling generating member does not come in contact with the focus ring 122. Thus, it is possible to independently set operation feelings and their respective operation forces.

2.2. Operation Mechanism Configuration Example

Figure 4:
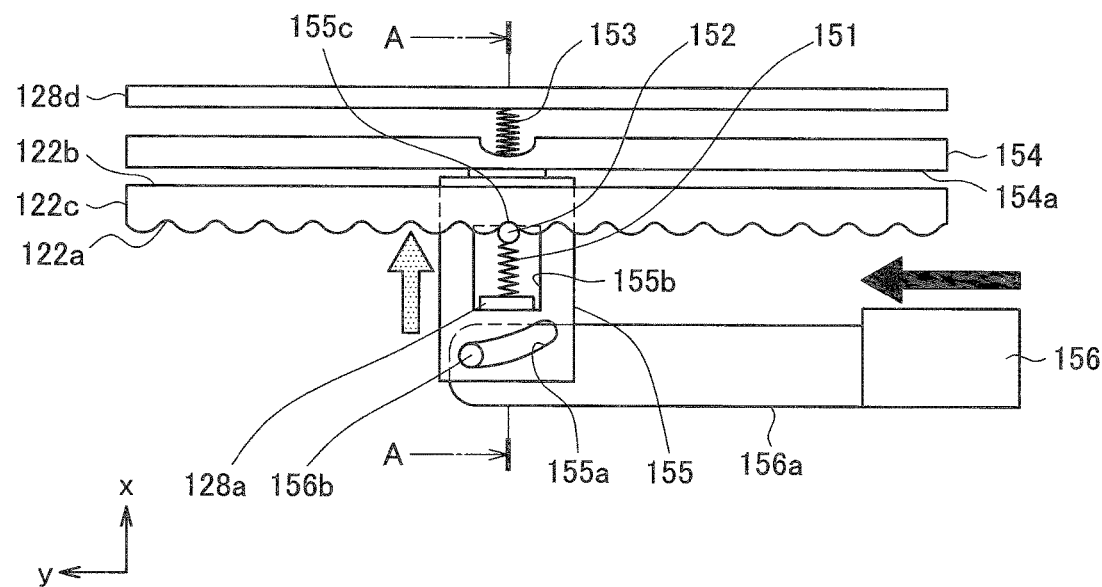
FIG. 4 is an explanatory view illustrating a state of the operation-feeling switching mechanism of the focus ring in a click mode, being provided by viewing the imaging apparatus in a z direction.
Figure 5:
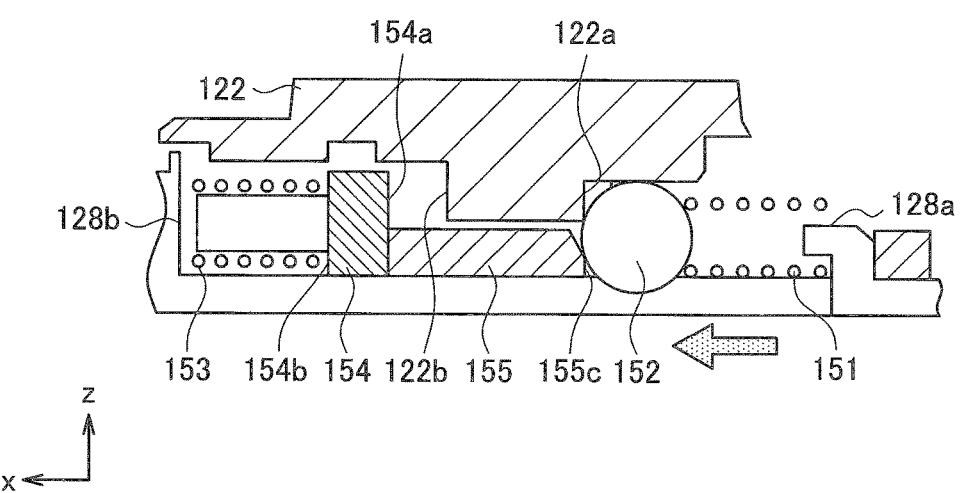
FIG. 5 is an end view taken along the A-A cutting-plane line in FIG. 4.
Figure 6:
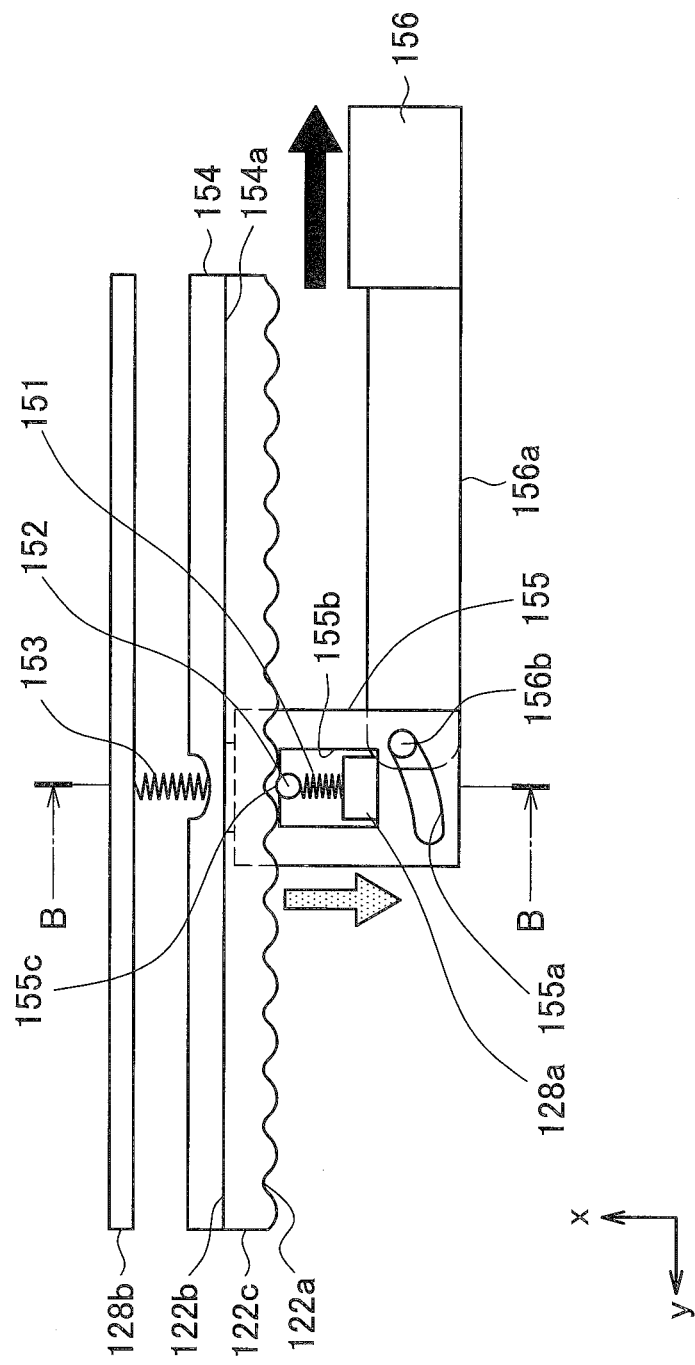
FIG. 6 is an explanatory view illustrating a state of the operation-feeling switching mechanism of the focus ring in a continuous mode, being provided by viewing the imaging apparatus in the z direction.
Figure 7:
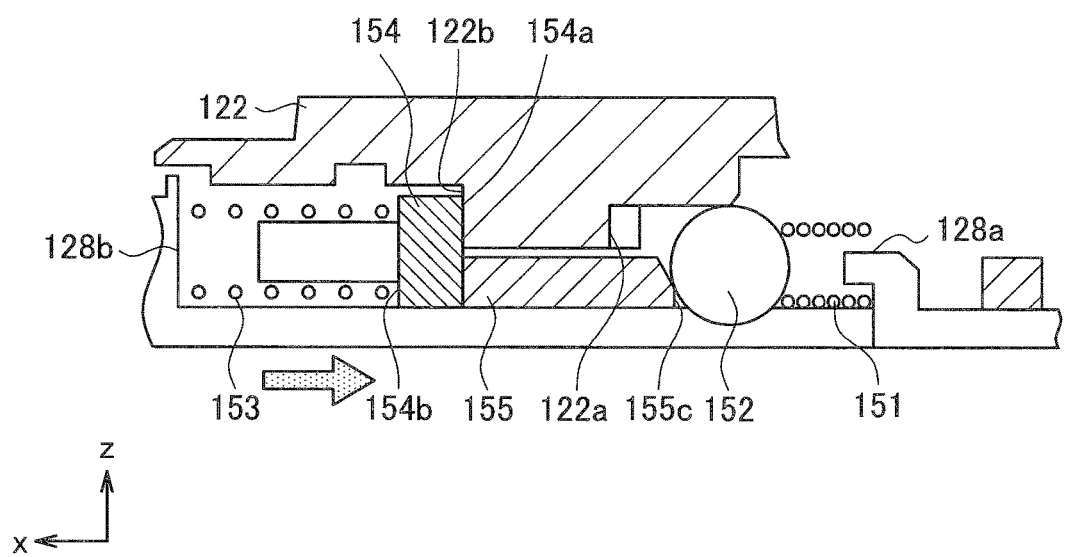
FIG. 7 is an end view taken along the B-B cutting-plane line in FIG. 5.

A configuration example of the focus ring 122 including the operation-feeling switching mechanism will be described based on FIGS. 4 to 7. FIG. 4 is an explanatory view illustrating a state of the operation-feeling switching mechanism of the focus ring 122 in the click mode, being provided by viewing the imaging apparatus 100 in a z direction. FIG. 5 is an end view taken along the A-A cutting-plane line in FIG. 4. FIG. 6 is an explanatory view illustrating a state of the operation-feeling switching mechanism of the focus ring 122 in the continuous mode, being provided by viewing the imaging apparatus 100 in the z direction. FIG. 7 is an end view taken along the B-B cutting-plane line in FIG. 6. For easy explanation, FIGS. 4 and 6 depict the focus ring 122 that is the operation part having only the flange part 122c.

Note that in the present embodiment, the operation mechanism refers to: the focus ring 122 that is the operation part; and the operation-feeling switching mechanism. The operation-feeling switching mechanism refers to a component that causes the operation-feeling generating member to move for switching the operation feelings on the operation part and to act on the operation part.

(1) Configuration

The wavy protrusions and recesses in a rotation axis direction (an x direction) are formed on the first surface 122a of the flange part 122c. The ball 152 that is the operation-feeling generating member for generating a click feeling is provided, facing the first surface 122a. The ball 152 is a copper ball, for example.

The ball 152 is provided in contact with one end of a first compression coil spring 151 that is a resilient member. The first compression coil spring 151 extends in the direction of the rotation axis of the focus ring 122 (x direction). The other end of the first compression coil spring 151 is fixed on a part (hereinafter, also referred to as "a first fixed part 128a") of the fixed frame 128. The ball 152 is in contact with a holder 155 of the switching part 156 on an opposite side of the ball 152 in the rotation axis direction (x direction) from the portion in contact with the one end of the first compression coil spring 151. In other words, the ball 152 is urged by the first compression coil spring 151 and is supported by being sandwiched between the first compression coil spring 151 and the holder 155.

In contrast, the second surface 122b that is opposite from the first surface 122a of the flange part 122c is formed flat. The resistive member 154 that is the operation-feeling generating member for generating sliding resistance is provided, facing the second surface 122b.

The resistive member 154 may use a member to which grease is applied, a cloth, and the like. The resistive member 154 has been adjusted to generate such friction that provides an appropriate operation feeling for easy user operation in rotating the focus ring 122 in contact with the second surface 122b of the flange part 122c. The resistive member 154 may be, for example, an annular member having a shape causing uniform contact with the second surface 122b of the flange part 122c.

The resistive member 154 has a resistive surface 154a of which part faces an end face of the holder 155 in the direction of the rotation axis of the focus ring 122 (x direction). These are always in contact with each other. Another part of the resistive surface 154a of the resistive member 154 faces the second surface 122b of the flange part 122c and is ready for contact with the second surface 122b. A surface 154b on the opposite side of the resistive member 154 from the resistive surface 154a is in contact with one end of a second compression coil spring 153 extending in the direction of the rotation axis of the focus ring 122 (x direction). The other end of the second compression coil spring 153 is fixed on a part (hereinafter, also referred to as a "second fixed part 128b") of the fixed frame 128. In other words, the resistive member 154 is urged by the second compression coil spring 153 and intervenes between the holder 155 and the second fixed part 128b.

The holder 155 in contact with the ball 152 and the resistive member 154 that are the operation-feeling generating members is a member whose position in the direction of the rotation axis of the focus ring 122 (x direction) varies with the position of the switching part 156. The holder 155 is a member having, for example: a guide part 155a in which a pin 156b of the switching part 156 is inserted; and an opening part 155b accommodating the ball 152, the first compression coil spring 151, and the first fixed part 128a.

The switching part 156 includes the pin 156b protruding in a height direction (a z direction) from an extending part 156a extending in a direction of the radius of the focus ring 122 (a y direction). The switching part 156 moves linearly in the direction of the radius of the focus ring 122 (y direction). The pin 156b is inserted in the guide part 155a of the holder 155. Meanwhile, the guide part 155a of the holder 155 is formed as an oblique opening, for example, so that the position, in the rotation axis direction (x direction), of the holder 155 can be changed with respect to the direction of the radius of the focus ring 122 (y direction). The pin 156b inserted in the guide part 155a can thereby cause the holder 155 to move in the x direction in accordance with the movement of the switching part 156 in the y direction. In addition, an inner surface 155c, in the opening part 155b of the holder 155, on the forward side of the x axis is always in contact with the ball 152.

In the present embodiment, components of the operation-feeling switching mechanism are the first compression coil spring 151, the second compression coil spring 153, the holder 155, and the switching part 156.

(2) State in Click Mode

In the click mode, the ball 152 is brought into contact with and pressed against the first surface 122a of the flange part 122c. As illustrated in FIGS. 4 and 5, the switching part 156 is moved in the y direction to the position set for the click mode. Then, the pin 156b moves to an end portion of the guide part 155a on the backward side of the y axis. Along with this, the holder 155 is moved toward the forward side of the x axis. Although a distance between the inner surface 155c of the holder 155 and the first fixed part 128a is gradually increased during this time, the first compression coil spring 151 keeps pressing the ball 152 toward the inner surface 155c of the holder 155. The holder 155 is moved toward the forward side of the x axis until the ball 152 comes in contact with the first surface 122a of the flange part 122c.

When the ball 152 comes in contact with the first surface 122a of the flange part 122c, the movement of the holder 155 in the forward direction of the x axis causes the resistive member 154 to also move in the forward direction of the x axis and to be separated from the second surface 122b of the flange part 122c. The second compression coil spring 153 between the resistive member 154 and the second fixed part 128b is in a more compressed state than before the ball 152 comes in contact with the first surface 122a of the flange part 122c.

As described above, the use feeling of the focus ring 122 becomes that in the state of the click mode. When the focus ring 122 is rotated in the click mode, the ball 152 pressed against the first surface 122a of the flange part 122c by the first compression coil spring 151 moves along the protrusions and recesses. At this time, it is necessary for the ball 152 to use a larger force in climbing over each protrusion than in moving along each recess. This can generate a click feeling in rotating the focus ring 122.

Moreover, the resistive member 154 is not in contact with the focus ring 122 in the click mode, and thus an operation force in rotating the focus ring 122 is only a force necessary for moving the ball 152 pressed against the first surface 122a. As described above, an easy-to-click operation force can be set in consideration for only action of the ball 152 on the focus ring 122, without being influenced by the other operation-feeling generating member.

(3) State in Continuous Mode

In the continuous mode, the resistive member 154 is brought into contact with and pressed against the second surface 122b of the flange part 122c. As illustrated in FIGS. 6 and 7, the switching part 156 is moved in the y direction to the position set for the continuous mode. Then, the pin 156b moves to an end portion of the guide part 155a on the forward side of the y axis. Along with this, the holder 155 is moved to the backward side of the x axis. At this time, the resistive member 154 is pressed by the second compression coil spring 153 and moves toward the backward side of the x axis. The holder 155 is moved toward the backward side of the x axis at least until the resistive member 154 comes in contact with the second surface 122b of the flange part 122c.

When the resistive member 154 comes in contact with the second surface 122b of the flange part 122c, the movement of the holder 155 in the backward direction of the x axis causes the ball 152 to also move in the backward direction of the x axis and to be separated from the first surface 122a of the flange part 122c. The first compression coil spring 151 between the ball 152 and the first fixed part 128a is in a more compressed state than before the resistive member 154 comes in contact with the second surface 122b of the flange part 122c.

As described above, the use feeling of the focus ring 122 becomes that in the state of the continuous mode. When the focus ring 122 is rotated in the continuous mode, it is possible to generate a smooth operation feeling while generating sliding resistance by using the resistive member 154 that is pressed against the second surface 122b of the flange part 122c by the second compression coil spring 153. Moreover, the ball 152 is not in contact with the focus ring 122 in the continuous mode, and thus the operation force in rotating the focus ring 122 is only a force against the sliding resistance generated by the resistive member 154 pressed against the second surface 122b. As described above, an easy-to-operate operation force in the continuous mode can be set in consideration for only action of the resistive member 154 on the focus ring 122, without being influenced by the other operation-feeling generating member.

3. Modifications

The configuration of the operation mechanism including the operation-part operation-feeling switching mechanism according to the embodiment of the present disclosure is not limited to the aforementioned configuration, and may be configurations to be described below, for example.

3.1. Directions of Acting on Operation Part by Operation-Feeling Generating Member Directions in which the plurality of operation-feeling generating members generating different operation feelings act on the operation parts in the operation mechanism may be determined according to the configurations of the operation parts. For example, as illustrated in FIG. 8, an operation-feeling generating member may act on an inner or outer peripheral surface of an annular dial operation part 210 by being moved in a direction of the radius of the operation part 210.

Figure 8:
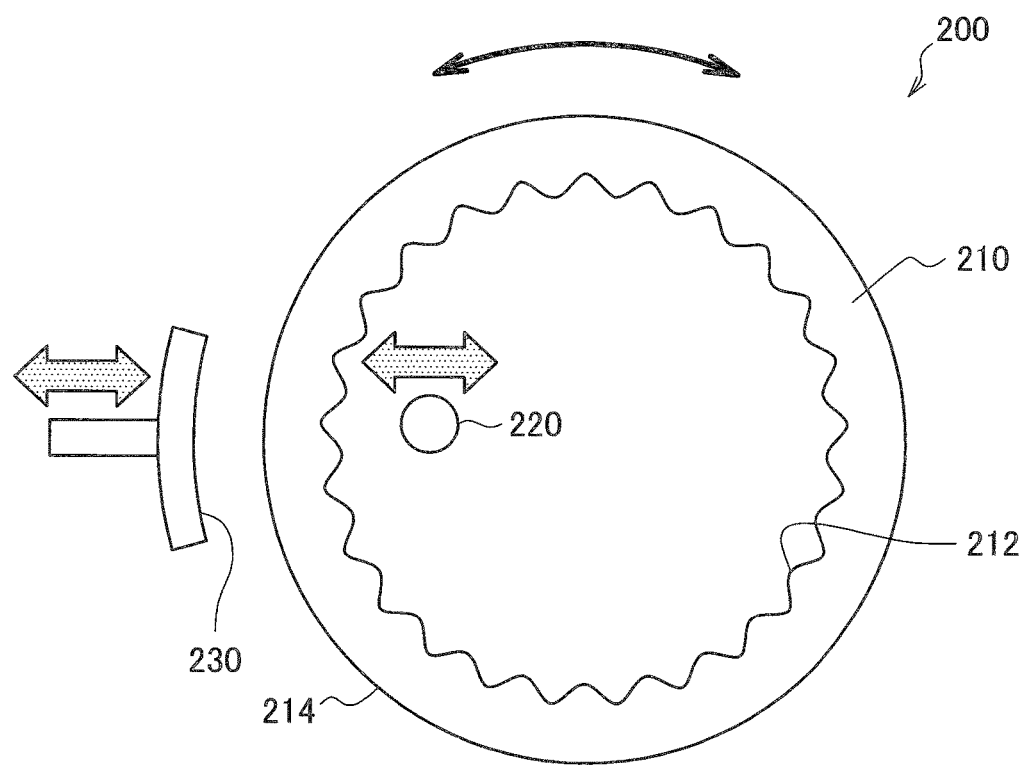
FIG. 8 is an explanatory view illustrating a configuration example of a case where operation-feeling generating members act on an annular operation part in a radial direction.

An operation mechanism 200 in FIG. 8 includes protrusions and recesses and a ball 220 for generating a click feeling, the protrusions and recesses being formed on an inner peripheral surface 212 of the operation part 210 in a circumferential direction, the ball 220 being disposed to face the inner peripheral surface 212. In contrast, for generating a smooth and continuous operation feeling, a resistive member 230 is disposed to face a flat outer peripheral surface 214 of the operation part 210. The ball 220 and the resistive member 230 are moved in the direction of the radius of the operation part 210 by using a switching part (not shown) so that only one of the ball 220 and the resistive member 230 can act on the operation part 210 according to the corresponding operation-feeling mode. In other words, the ball 220 and the resistive member 230 act on the operation part 210 independently from each other.

As described above, the operation mechanism 200 can exert the same function as that of the operation mechanism in FIGS. 3 to 7. In FIG. 8, the component for generating a click feeling is disposed on the inner peripheral side of the operation part 210, while the component for generating a continuous and smooth operation feeling is disposed on the outer peripheral side. However, the embodiment of the present disclosure is not limited to the example. For example, the component for generating a click feeling may be disposed on the outer peripheral side of the operation part 210, while the component for generating a continuous and smooth operation feeling may be disposed on the inner peripheral side.

Figure 9:
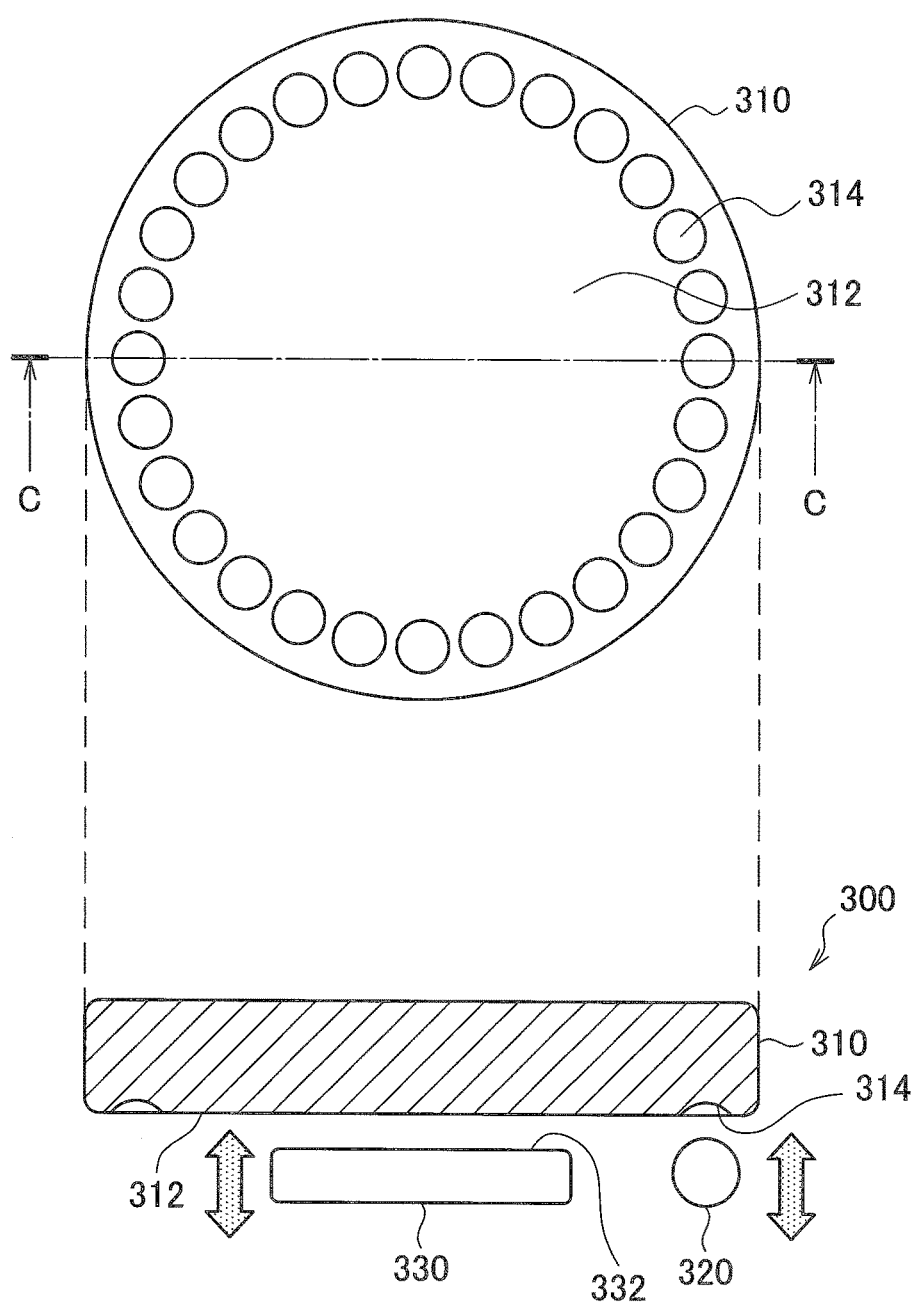
FIG. 9 is an explanatory view illustrating a configuration example of a case where operation-feeling generating members act on a disk-shaped operation part in a rotation-axis direction.

Alternatively, as illustrated in FIG. 9, for example, an operation-feeling generating member may act on a surface 312 of a disk-shaped dial operation part 310 by being moved in a direction of the rotation axis of the operation part 310. The dial operation part 310 of the imaging apparatus 100 is, for example, the mode dial 132, the exposure adjustment dial 134, the control dial 136, or the like.

An operation mechanism 300 in FIG. 9 includes a plurality of concave portions 314 and a ball 320 for generating a click feeling, the concave portions 314 being formed on the surface 312 of the operation part 310 at regular intervals in the circumferential direction, the ball 320 being disposed to face the corresponding concave portion 314. In contrast, for generating a smooth and continuous operation feeling, a resistive member 330 is disposed to face the surface 312 so that the ball 320 can act on portions except the concave portions 314 in the surface 312 of the operation part 310. The ball 320 and the resistive member 330 are movable only in the rotation axis direction.

The ball 320 and the resistive member 330 are moved in the direction of the rotation axis of the operation part 310 by using a switching part (not shown) so that only one of the ball 320 and the resistive member 330 can act on the operation part 310 according to the corresponding operation-feeling mode. In the click mode, the ball 320 is pressed by a resilient member such as a compression coil spring against a circular action-area in the corresponding concave portion 314 in the operation part 310. Upon rotation of the operation part 310 about the rotation axis, the ball 320 pressed against the concave portion 314 is pushed off the concave portion 314 due to a rotating force of the operation part 310. Upon further rotation of the operation part 310, the ball 320 is pressed against the next concave portion 314 moved to the position of the ball 320 by the resilient member. Repeating such a movement of the ball 320 during the rotation of the operation part 310 cyclically changes an operation force necessary for rotating the operation part 310, thus enabling generation of a click feeling. In the click mode, the resistive member 330 is not in contact with the operation part 310.

In the continuous mode in contrast, the resistive member 330 is pressed against the surface 312 of the operation part 310 by a resilient member such as a compression coil spring. Upon rotation of the operation part 310 about the rotation axis, the resistive member 330 generates sliding resistance, and the operation part 310 can be rotated with a constant operation force. At this time, the ball 320 is not in contact with the operation part 310.

The ball 320 and the resistive member 330 can act independently from each other on the operation part 310 by using the switching part (not shown). The operation mechanism 300 can thereby set operation feelings independently from each other and exert the same function as that of the operation mechanism in FIGS. 3 to 7.

Note that in FIG. 9 the ball 320 and the resistive member 330 that are operation-feeling generating members are formed on the same side of the operation part 310 in the rotation axis, but the embodiment of the present disclosure is not limited to the example. For example, the ball 320 and the resistive member 330 may act on respective different surfaces of the operation part 310 by moving in the rotation axis direction. In FIG. 9, the ball 320 is disposed on the outer peripheral portion side in a direction of the radius of the operation part 310, while the resistive member 330 is disposed on the center side. However, the embodiment of the present disclosure is not limited to the example. For example, the ball 320 may be disposed on the center side in the direction of the radius of the operation part 310, while the resistive member 330 may be disposed on the outer peripheral portion side.

3.2. Changing Degree of Operation Feeling

The description above takes, as examples of different operation feelings, a click feeling and a smooth operation feeling without the click feeling. However, it is also possible to generate different operation feelings, for example, by making the degrees of operation feelings different from each other.

(1) Changing Load for Operation Feeling

Figure 10:
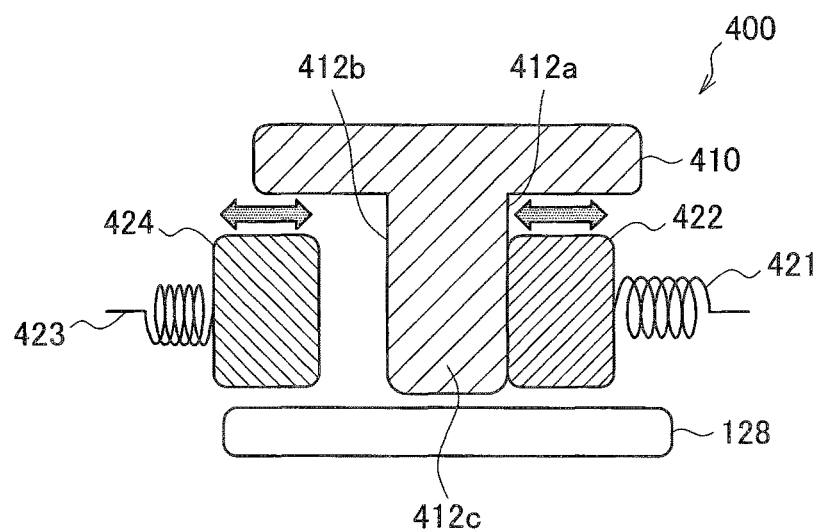
FIG. 10 is an explanatory view illustrating a configuration example of a mechanism generating different load-force operation feelings in the continuous mode.

An operation mechanism 400 in FIG. 10 is configured such that an operation part 410 can be operated with a smooth operating feeling without a click feeling and such that different operation feelings can be generated by switching degrees of resistance in sliding the operation part 410. The example in FIG. 10 is an end view schematically illustrating part of an annular portion of an annular operation member 410 cut along the diameter passing through the center of rotation, like FIGS. 3 to 7. The operation part 410 is rotatable toward the front or rear side of the drawing plane of FIG. 10. The operation part 410 has, on its inner peripheral surface, a flange part 412c protruding toward an outer peripheral surface of the fixed frame 128.

A first resistive member 422 is provided, facing a first surface 412a of the flange part 412c. A second resistive member 424 is provided, facing a second surface 412b opposite from the first surface 412a. The first resistive member 422 and the second resistive member 424 are configured such that a switching part (not shown) causes only one of the first and second resistive members 422 and 424 to come in contact with the flange part 412c. When being in contact with the first surface 412a of the flange part 412c, the first resistive member 422 is pressed against the first surface 412a by a first resilient member 421 such as a compression coil spring. When being in contact with the second surface 412b of the flange part 412c, the second resistive member 424 is pressed against the second surface 412b by a second resilient member 423 such as a compression coil spring.

In the operation mechanism 400, an operation force necessary for rotating the operation part 410 varies with the resistive member in contact with the flange part 412c, thus generating a different operation feeling. The operation feelings can be made different from each other, for example, by making different the degrees of resilient forces of the first and second resilient members 421 and 423. The more resilient a resilient member is, for example, the larger a spring constant of a compression coil spring is, the larger sliding resistance generated by the resistive member is. Thus, it is possible to provide the operation part 410 with a heavy operation feeling. Alternatively, by making materials of the first and second resistive members 422 and 424 different, the operation feelings can be made different. Increasing a friction constant of a resistive member increases larger sliding resistance to be generated, thus enabling the operation part 410 to be provided with a heavy operation feeling.

As described above, the operation mechanism 400 can exert the same function as that of the operation mechanism in FIGS. 3 to 7. With reference to FIG. 10, the description has heretofore been given of the operation mechanism 400 configured to independently switch the operation feelings in the continuous mode in which the operation part 410 is operated with a smooth operation feeling without the click feeling. However, the embodiment of the present disclosure is not limited to the example. For example, the degrees of the operation feelings in the click mode are switchable independently from each other in the same manner.

In addition, the operation-feeling generating members may act on the operation part 410 in directions other than those illustrated in FIG. 10. For example, as in FIG. 8, each operation-feeling generating member may act on the corresponding inner or outer peripheral surface of the annular operation part by being moved in the operation-part radial direction. Alternatively, as in FIG. 9, for example, each operation-feeling generating member may act on the one surface of the disk-shaped operation part by being moved in the operation-part rotation-axis direction.

(2) Changing Number of Clicks

Figure 11:
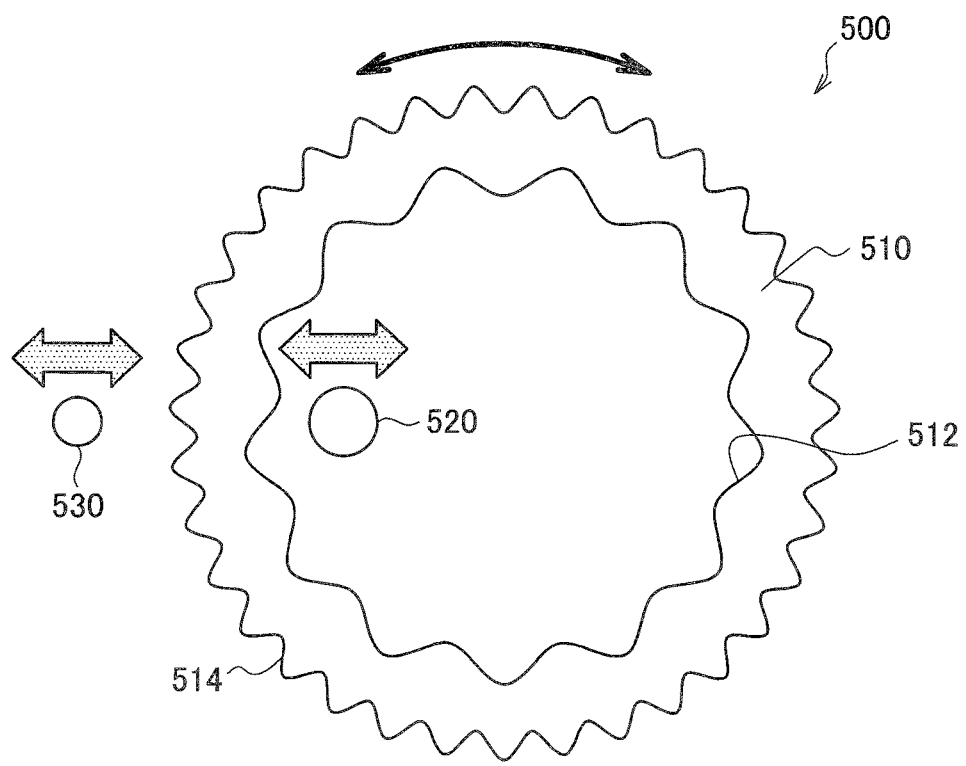
FIG. 11 is an explanatory view illustrating a configuration example of a mechanism generating different click feelings in the click mode.

An operation mechanism 500 in FIG. 11 is configured to switch the degrees of click feelings on an operation part 510 to generate different operation feelings. The degree of each click feeling is determined based on a pitch (a distance between each adjacent two protrusion crests) of protrusions and recesses that generate clicks. The larger an amount of movement per click of the operation part 510 is, the larger the degree of the click feeling is.

The operation mechanism 500 in FIG. 11 generates different click feelings by moving the operation-feeling generating members of the annular operation part 510 in a direction of the radius of the operation part 510, as in FIG. 8. Protrusions and recesses are formed on an inner peripheral surface 512 of the operation part 510 at a first pitch in the circumferential direction. A first ball 520 is disposed, facing the inner peripheral surface 512. In contrast, protrusions and recesses are formed on an outer peripheral surface 514 of the operation part 510 at a second pitch in the circumferential direction. A second ball 530 is disposed, facing the outer peripheral surface 514. In the example in FIG. 11, the first pitch is larger than the second pitch.

The first and second balls 520 and 530 are moved in a direction of the radius of the operation part 510 by using the switching part (not shown) so that only one of the first and second balls 520 and 530 can act on the operation part 510 in accordance with the degree of a click feeling to be generated. In other words, the first and second balls 520 and 530 act on the operation part 510 independently from each other. When being in contact with the inner peripheral surface 512, the first ball 520 is pressed against the inner peripheral surface 512 by a resilient member such as a compression coil spring. When being in contact with the outer peripheral surface 514, the second ball 530 is pressed against the outer peripheral surface 514 by a resilient member such as a compression coil spring.

For example, when the first ball 520 is pressed against the inner peripheral surface 512 of the operation part 510, the user can operate the operation part 510 with a large degree of click feeling (hereinafter, also referred to as a "first click feeling"). At this time, the second ball 530 is separated from the operation part 510. In contrast, when the second ball 530 is pressed against the outer peripheral surface 514 of the operation part 510, the user can operate the operation part 510 with a second click feeling of which degree is smaller than the first click feeling. At this time, the first ball 520 is separated from the operation part 510.

As described above, the operation mechanism 500 can exert the same function as that of the operation mechanism in FIGS. 3 to 7. Note that the operation-feeling generating members may act on the operation part 510 in directions other than those illustrated in FIG. 11. For example, as in FIGS. 3 to 7, the operation-feeling generating members may act on an annular operation part by being moved in the rotation axis with respect to a flange part extending in the operation-part radial direction. Alternatively, as in FIG. 9, for example, the operation-feeling generating members may act on a surface of a disk-shaped operation part by being moved in the operation-part rotation-axis direction.

Note that the operation mechanisms described based on FIGS. 3 to 11 can each switch two different operation feelings on the operation part in the description, but may each be configured by combining these configurations. For example, in the operation mechanism 400 in FIG. 10, the protrusions and recesses are formed on the outer peripheral surface of the operation part 410 or the inner peripheral surface of the flange part 412c, and a ball is disposed facing these. This enables not only the two different continuous modes but also the click mode to be set for the operation part 410.

Moreover, the aforementioned operation mechanisms can be configured to switch three different operation feelings. For example, in the example in FIG. 8, a resistive member having a different friction coefficient from that of the resistive member 230 may further be provided to act on the outer peripheral surface 214. Alternatively, forces of pressing the resistive member 230 against the operation part 210 can be set to switch the forces stepwise to generate a plurality of different operation feelings. In each operation mechanism described above, only one operation-feeling generating member for the selected operation-feeling mode acts on the operation part. At this time, the other operation-feeling generating members are separated from the operation part.

3.3. Switching Operation Feelings and Functions

Functions of the operation part can also be switched, when the operation feelings on the operation part are switched by using the switching part of the operation mechanism described above. For example, the zoom ring for adjusting zoom and the iris ring for setting the f number may be combined as an operation ring. The functions of the operation ring may thus be changed, when the two different operation feelings are switched by using the switching part. Specifically, the operation ring is configured like the focus ring 122 in FIGS. 3 to 7. The operation ring is caused to function as the zoom ring when the continuous mode is selected, and as the iris ring when the click mode is selected. This can integrate the two rings into one.

Moreover, the continuous mode is assigned to zoom adjustment frequently performed as continuous adjustment, and the click mode is assigned to f-number setting desired to be set accurately. The operation ring can thereby be provided with operation feelings easy to operate and suitable for the respective functions, and the operability is enhanced. As a matter of course, the operation ring may function as the iris ring when the continuous mode is selected, and as the zoom ring when the click mode is selected.

In another example, also in the case where the different click feelings can be generated like the operation mechanism 500 in FIG. 11, the functions of the operation part can be changed when the two different operation feelings are switched by using the switching part. For example, the f number can be set in selecting the mode involved with a smaller number of clicks, that is, a large movement amount per click and a large degree of click feeling, while an exposure value can be set in selecting the mode involved with a larger number of clicks, that is, a small movement amount per click and a small degree of click feeling. The assignment of the functions to the operation part based on the operation feeling may also be determined based on the number of set positions. For example, since the exposure value is subjected to finer adjustment than the f number is, the mode involved with the small degree of click feeling is assigned to the exposure value setting.

4. Operating Operation-Feeling Switching Mechanism

The operation feelings on the operation part by using the switching part in the operation mechanism described above may be switched by the user by manually operating the switching part, or may be automatically switched in accordance with a shooting mode of the imaging apparatus 100. For automatically switching the operation feelings, the imaging apparatus 100 is provided with: a switching driver part that drives the switching part; and a switching controller part that controls the switching driver part. The shooting mode includes a still-image shooting mode for shooting a still image and a video-image shooting mode for shooting a video image. The switching controller part detects the setting of the shooting mode and switches the operation feelings on the operation part in accordance with the shooting mode.

For example, when the still-image shooting mode is set, the switching controller part controls the switching driver part to set the focus ring 122 in FIG. 3 to FIG. 7 in the click mode. In contrast, when the video-image shooting mode is set, the switching controller part controls the switching driver part to set the focus ring 122 in the continuous mode. By setting the operation-feeling mode of the focus ring 122 as the continuous mode when the imaging apparatus 100 is set in the video-image shooting mode, operation sound generation can be prevented not to hinder audio acquisition in the shooting.

It should be understood by those skilled in the art that various modifications, combinations, sub-combinations and alterations may occur depending on design requirements and other factors insofar as they are within the scope of the appended claims or the equivalents thereof.

For example, the embodiment of the present disclosure has heretofore described switching the operation feelings on the annular or disk-shaped operation parts operated by rotating the operation parts. However, the embodiment of the present disclosure is not limited to the example, and is likewise applicable to, for example, a sliding operation part operated by linearly moving the operation part.

In addition, the aforementioned embodiment uses the ball as the operation-feeling generating member generating a click feeling, but is not limited to the example. For example, instead of the ball, a plate spring may be used as the operation-feeling generating member generating the click feeling. Further, the embodiment of the present disclosure has heretofore described the operation mechanism including the operation-feeling switching mechanism in the imaging apparatus 100 such as a digital still camera or a camcorder, but is not limited to the example. The embodiment is also applicable to an operation part of, for example, an audio device, a personal computer, or a mobile communication terminal such as a smartphone or a tablet terminal, and also applicable to, for example, a dial for volume adjustment of a speaker.

In addition, the advantageous effects described in the specification are merely explanatory or illustrative, and are not limited. In other words, the technology according to the present disclosure can exert other advantageous effects that are clear to those skilled in the art from the description of the specification, in addition to or instead of the advantageous effects described above.

Additionally, the present technology may also be configured as below.

(1) An operation mechanism including:

an operation part that is slidable with respect to a fixed part;

a plurality of operation-feeling generating members configured to generate different operation feelings on the operation part; and a switching part configured to switch the plurality of operation-feeling generating members independently from each other to switch to one of the operation-feeling generating members that is to act on the operation part.

(2) The operation mechanism according to (1), wherein the switching part switches a first operation-feeling generating member and a second operation-feeling generating member, the first operation-feeling generating member applying an operation load to the operation part and continuously slidably acting on the operation part, the second operation-feeling generating member acting on the operation part to generate click feelings as the operation part slides.

(3) The operation mechanism according to (2), wherein the first operation-feeling generating member comes in contact with the operation part to apply the operation load and generate sliding resistance.

(4) The operation mechanism according to (2) or (3), wherein protrusions and recesses in accordance with intervals of the click feelings are formed on the operation part in portions with which the second operation-feeling generating member is to come in contact, and wherein the second operation-feeling generating member is urged against the protrusions and recesses to generate the click feelings as the operation part slides.

(5) The operation mechanism according to any one of (1) to (4),
wherein the operation part is an annular member including a flange part with which the operation-feeling generating members come in contact in a circumferential direction, and
wherein the plurality of operation-feeling generating members act, independently from each other, on a first surface and a second surface of the flange part, the first surface being located with respect to a rotation axis of the operation part, the second surface being located on an opposite side from the first surface.

(6) The operation mechanism according to any one of (1) to (4),
wherein the operation part is an annular member, and
wherein the plurality of operation-feeling generating members act, in a direction of a radius of the operation part, on at least one of an inner peripheral surface and an outer peripheral surface of the operation part.

(7) The operation mechanism according to any one of (1) to (4),
wherein the operation part is a plate member that is rotatable about a rotation axis of the operation part, and
wherein the plurality of operation-feeling generating members act on a first surface of the operation part or on at least one of the first surface and a second surface of the operation part, the first surface being located with respect to a rotation axis of the operation part, the second surface being located on an opposite side from the first surface.

(8) The operation mechanism according to (1),
wherein the plurality of operation-feeling generating members have different degrees of operation loads applied to the operation part.

(9) The operation mechanism according to (1),
wherein the operation part has a plurality of protruding-and-recessed surfaces having respective different protrusion-recess pitches,
wherein the operation-feeling generating members are urged against the respective protruding-and-recessed surfaces, and
wherein by switching the operation-feeling generating members, the switching part generates different click feelings as the operation part slides.

(10) The operation mechanism according to any one of (1) to (9),
wherein the switching part changes functions of the operation part, while switching the operation-feeling generating members.

(11) An imaging apparatus including:
an imaging part;
one or a plurality of operation parts; and
a controller part configured to control the imaging part based on information of the one or the plurality of operation parts,
wherein the at least one operation part is slidable with respect to a fixed part and includes
a plurality of operation-feeling generating members that generate different operation feelings on the operation part, and
a switching part that switches the plurality of operation-feeling generating members independently from each other to switch to one of the operation-feeling generating members that is to act on the operation part.

(12) The imaging apparatus according to (11), including
a switching controller part configured to switch the operation feelings on the operation part based on a shooting mode of the imaging apparatus.

What is claimed is:

1. An operation mechanism, comprising:
an operation part configured to slide with respect to a fixed part;
a plurality of operation-feeling generating members configured to generate different operation feelings on the operation part; and
a switching part configured to switch the plurality of operation-feeling generating members independently from each other to switch to one of the plurality of operation-feeling generating members that is to act on the operation part,
wherein a first of the plurality of operation-feeling generating members is configured to act on an inner peripheral surface of the operation part and a second of the plurality of operation-feeling generating members is configured to act on an outer peripheral surface of the operation part, and
wherein each of the inner peripheral surface and the outer peripheral surface comprises a plurality of protrusions and recesses, and the inner peripheral surface and the outer peripheral surface have different protrusion-recess pitches.

2. The operation mechanism according to claim 1,
wherein the switching part is further configured to switch the first of the plurality of operation-feeling generating members and the second of the plurality of operation-feeling generating members, wherein the first operation-feeling generating member is further configured to apply an operation load to the operation part and continuously slidably act on the operation part, and the second operation-feeling generating member is further configured to act on the operation part to generate click feelings as the operation part slides.

3. The operation mechanism according to claim 2,
wherein the first operation-feeling generating member is further configured to come in contact with the operation part to apply the operation load and generate sliding resistance.

4. The operation mechanism according to claim 2,
wherein the second operation-feeling generating member is urged against the plurality of protrusions and recesses to generate the click feelings as the operation part slides.

5. The operation mechanism according to claim 1,
wherein the operation part is an annular member that includes a flange part with which the operation-feeling generating members are configured to come in contact in a circumferential direction, and
wherein the plurality of operation-feeling generating members are further configured to act, independently from each other, on a first surface and a second surface of the flange part, wherein the first surface is located with respect to a rotation axis of the operation part, and the second surface is located on an opposite side from the first surface.

6. The operation mechanism according to claim 1,
wherein the operation part is an annular member, and
wherein the plurality of operation-feeling generating members are further configured to act, in a direction of a radius of the operation part.

7. The operation mechanism according to claim 1,
wherein the operation part is a plate member configured to rotate about a rotation axis of the operation part, and
wherein the plurality of operation-feeling generating members are further configured to act on at least one of a first surface and a second surface of the operation part, wherein the first surface is located with respect to a rotation axis of the operation part, the second surface is located on an opposite side from the first surface.

8. The operation mechanism according to claim 1, wherein the plurality of operation-feeling generating members are further configured to apply different degrees of operation loads to the operation part.

9. The operation mechanism according to claim 1, wherein the operation-feeling generating members are urged against the inner peripheral surface or the outer peripheral surface, and
wherein by switching the operation-feeling generating members, the switching part is further configured to generate different click feelings as the operation part slides.

10. The operation mechanism according to claim 1, wherein the switching part is further configured to change functions of the operation part, in an event the operation-feeling generating members are switched.

11. An imaging apparatus, comprising:
an imaging part;
one or more operation parts; and
a controller part configured to control the imaging part based on information of the one or more operation parts,
wherein at least one operation part of the one or more operation parts is configured to slide with respect to a fixed part and includes:
a plurality of operation-feeling generating members configured to generate different operation feelings on the at least one operation part, and
a switching part configured to switch the plurality of operation-feeling generating members independently from each other to switch to one of the operation-feeling generating members that is to act on the at least one operation part,
wherein a first of the plurality of operation-feeling generating members is configured to act on an inner peripheral surface of the at least one operation part and a second of the plurality of operation-feeling generating members is configured to act on an outer peripheral surface of the at least one operation part, and
wherein each of the inner peripheral surface and the outer peripheral surface comprises a plurality of protrusions and recesses, and the inner peripheral surface and the outer peripheral surface have different protrusion-recess pitches.

12. The imaging apparatus according to claim 11, further comprising
a switching controller part configured to switch the operation feelings on the at least one operation part based on a shooting mode of the imaging apparatus.

13. An operation mechanism, comprising:
an operation part configured to slide with respect to a fixed part;
a plurality of operation-feeling generating members configured to generate different operation feelings on the operation part; and
a switching part configured to switch the plurality of operation-feeling generating members independently from each other to switch to one of the plurality of operation-feeling generating members that is to act on the operation part,
wherein a first of the plurality of operation-feeling generating members is configured to act on a first surface of the operation part and a second of the plurality of operation-feeling generating members is configured to act on a second surface of the operation part, wherein the second surface is located on an opposite side from the first surface, and
wherein each of the first surface and the second surface comprises a plurality of protrusions and recesses, and the first surface and the second surface have different protrusion-recess pitches.

* * * * *